April 28, 1964     P. H. CRONELID ETAL     3,130,564
ABSORPTION REFRIGERATION

Filed May 31, 1960                         4 Sheets-Sheet 3

April 28, 1964 P. H. CRONELID ETAL 3,130,564
ABSORPTION REFRIGERATION
Filed May 31, 1960 4 Sheets-Sheet 4

INVENTORS
Paul Herbert Cronelid
BY Colin Stanley Hocking
Edmund A. [illegible]
ATTORNEY United States Patent Office 3,130,564
Patented Apr. 28, 1964

3,130,564
ABSORPTION REFRIGERATION
Paul Herbert Cronelid, Stockholm, and Colin Stanley Hocking, Bandhagen, Sweden, assignors to Aktiebolaget Electrolux, Stockholm, Sweden, a corporation of Sweden
Filed May 31, 1960, Ser. No. 32,993
Claims priority, application Sweden June 4, 1959
12 Claims. (Cl. 62—487)

Our invention relates to refrigeration systems of the absorption type.

It is an object of our invention to effect improvements in systems of this type, particularly to provide new arrangements for insulating the vapor expulsion unit or generator from the surroundings.

Another object of the invention is to provide such new arrangements in which a vapor expulsion unit or generator, having a cluster of pipes forming component parts thereof, is thermally shielded from the surroundings with the aid of a plurality of layers of insulation of which the outer insulation layer is of lower thermal conductivity than that of an inner insulation layer.

A further object of the invention is to thermally shield and insulate the vapor expulsion unit or generator from the surroundings by an outer layer of insulation which is adversely affected and loses at least some of its thermal insulating properties when subjected to heat at elevated temperatures corresponding to temperatures developed by the generator piping during normal operation of the refrigeration system, and to thermally shield the outer layer of insulation from the generator piping by the inner layer of insulation which is capable of withstanding the heat developed by the vapor expulsion unit during normal operation of the system.

The invention, together with the above and other objects and advantages thereof, will be more fully understood upon reference to the following description and accompanying drawing forming a part of this specification, of which:

Figure 1:
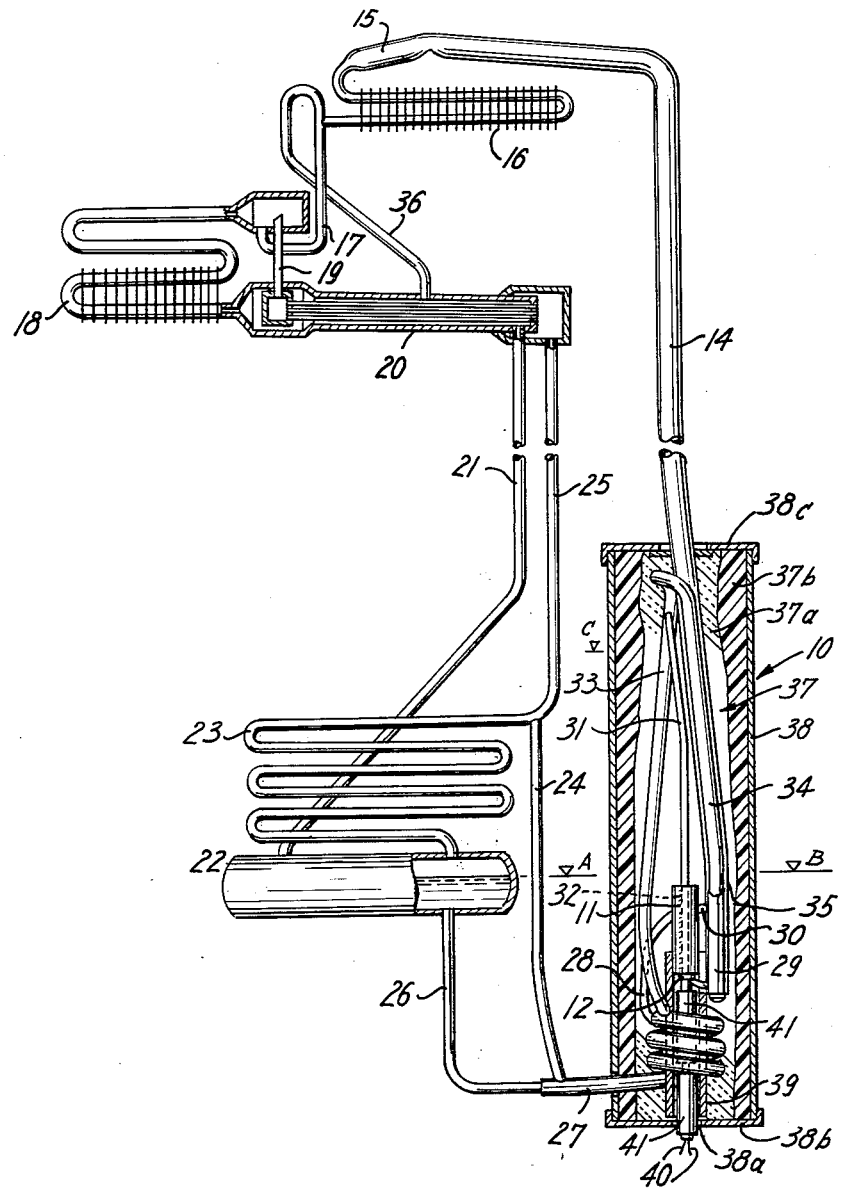
FIG. 1 illustrates more or less diagrammatically absorption refrigeration apparatus which embodies the invention.

Referring to FIG. 1, we have shown our invention embodied in an absorption refrigeration system of a uniform pressure type in which an inert pressure equalizing gas is employed. A refrigeration system of this type comprises a vapor-expulsion unit or generator 10 containing a refrigerant, such as ammonia, in solution in a body of absorption liquid, such as water. Heat is supplied to the vapor-expulsion unit 10 from a heating tube 11 in a manner to be described presently, the heating tube 11 being closed at its upper end and arranged to be heated by an electrical heating element 12 disposed within the tube.

The heat supplied to the vapor expulsion unit and absorption solution contained therein expels refrigerant vapor out of solution, and, in a manner which will be described hereinafter, the refrigerant vapor passes upwardly from the vapor-expulsion unit 10 through a vapor supply line or conduit 14 and an air-cooled rectifier 15 into an air-cooled condenser 16 in which it is condensed and liquefied. Liquid refrigerant flows from condenser 16 through a conduit 17 into a cooling element 18 in which it evaporates and diffuses into an inert pressure equalizing gas, such as hydrogen, which enters through a conduit 19. Due to evaporation of refrigerant fluid into inert gas in cooling element 18, a refrigerating effect is produced with consequent absorption of heat from the surroundings.

The rich gas mixture of refrigerant vapor and inert gas formed in cooling element 18 flows from the lower part thereof through one passage of a gas heat exchanger 20, a conduit 21 and an absorber vessel 22 into the lower end of an absorber coil 23. In absorber coil 23 the rich gas mixture flows counter-current to downwardly flowing absorption liquid which enters through a conduit 24. The absorption liquid absorbs refrigerant vapor from inert gas and inert gas weak in refrigerant flows from absorber coil 23 in a path of flow including a conduit 25, another passage of gas heat exchanger 20 and conduit 19 into the upper part of cooling element 18.

Absorption solution enriched in refrigerant flows from the absorber vessel 22 through a conduit 26, an inner passage of a liquid heat exchanger 27 and a connection 28 into a vertically extending pipe 29 at a point 30 which is at a level below the liquid surface level A of the body of liquid held in the absorber vessel 22. The extreme lower end of pipe 29 is in communication with the lower end of a pump pipe or vapor lift tube 31 in thermal exchange relation with the heating tube 11 at 32, as by welding, for example. The part of the pump or lift pipe 31 in thermal exchange relation with the heating tube 11 may be referred to as the vapor-forming part, in which vapor bubbles are formed due to heat derived from the heating tube. Due to the formation of these vapor bubbles which tend to collect and become larger and larger, liquid in the lift pipe 31 becomes segregated, whereby slugs of liquid are caused to rise in the lift pipe by vapor lift action. Upward movement is imparted to liquid in the vapor lift pipe 31 under the influence of a "reaction head" formed by the liquid column maintained in pipe 29.

Vapor generated in the vapor lift pipe 31 flows from the upper end thereof through the upper part of standpipe 33 and a conduit 34 to a region 35 in pipe 29 which serves as an analyzer and is disposed below the liquid surface level B of the liquid column contained therein, the liquid level B being essentially the same as the liquid level A in the absorber vessel 22. The absorption liquid introduced into the analyzer 35 is relatively rich in refrigerant and at a lower temperature than the generated vapor, and, in bubbling through the enriched solution, water vapor present in the vapor is cooled sufficiently and condenses and in this way is removed from ammonia vapor.

The absorption liquid from which refrigerant vapor has been expelled flows by gravity from standpipe 33 through the outer passage of liquid heat exchanger 27 and conduit 24 into the upper part of absorber coil 23. The liquid surface level C maintained in standpipe 33 is at a higher level than the region at which liquid is introduced into absorber 23 from the upper end of conduit 24. The outlet end of condenser 16 is connected by a conduit 36 to a part of the gas circuit, as to the outer passage of the gas heat exchanger 20, for example, so that any inert gas which may pass through the condenser 16 can flow to the gas circuit.

The vapor-expulsion unit 10 in its entirety, together with a major portion of the liquid heat exchanger 27, are embedded in a body of insulation 37 retained in a metal shell or casing 38 having an opening 38a at the bottom 38b thereof, the shell being rectangular or circular in horizontal cross-section. The heating tube 11 is embedded in a part of the insulation 37 which is intermediate the ends thereof and spaced from the top and bottom ends of the shell 38. The electrical heating element 12 is arranged to be positioned within the heating tube 11 through a hollow sleeve member 39 which is formed of suitable insulating material and extends from the bottom of the heating tube 11 to the bottom opening 38a in the shell 38.

The electrical conductors 40 for the electrical heating element 12 extend through a pair of apertured insulating members 41 held in end-to-end relation in the hollow sleeve member 39. The heating tube 11 snugly receives the heating element 12 which may comprise a cartridge housing an electrical wire or the like having a relatively high resistance that generates heat when connected to a source of electrical energy.

The vapor expulsion unit or generator 10 of FIG. 1 is formed of piping to provide a compact bundle or cluster of parts which is elongated in the vertical direction and is relatively narrow in horizontal cross-section. Thus, the heating tube 11, pump or vapor lift pipe 31, standpipes 29 and 33 and pipe 34 are formed of pipes or conduits disposed closely adjacent to one another. In order to reduce radiation heat losses and conserve heat, it is usually the practice to embed the parts of the generator or vapor-expulsion unit in a body of insulation having a passage therein which extends to the exterior of the insulating body, so that the electrical heating element 12 may be readily inserted into and removed from the heating tube 11.

In accordance with our invention, the generator 10 and heating tube 11 are insulated from the surroundings by the body of insulation 37 which includes an inner layer 37a of insulation and an outer layer 37b of insulation, the thermal conductivity of the outer layer 37b of insulation being poorer than that of the inner layer 37a of insulation. The outer insulating layer 37b comprises material which is adversely affected and loses at least some of its thermal insulating properties when subjected to heat at elevated temperatures corresponding to the elevated temperatures developed by the heating tube 11 and generator piping due to heating by the electrical heating element 12 during normal operation of the system. However, the outer insulating layer 37b is thermally shielded from the heating tube 11 and high temperature generator parts by the inner insulating layer 37a which is capable of withstanding the heat produced by the heating tube 11 during normal operation of the system. Desirably, the inner insulating layer 37a is so constructed and formed that the temperature gradient in an outward direction therethrough will be sufficient to enable the outer insulating layer 37b to tend to function for a relatively long period of time at a value of thermal conductivity approaching its normal value during normal operation of the system.

Silicon compounds in finely divided form, such as glass wool, for example, may be employed for the inner insulating layer 37a. The outer insulating layer 37b may be formed of foamed plastic which completely fills the space in shell 38 about the inner insulating layer 37a. It is possible to effect foaming of a suitable plastic in situ by adding to the plastic a chemical which liberates a heavy or dense gas in the resulting foamed insulation produced. Fluorine-substituted carbons which are sold under the trademark "Freon" are examples of such chemicals. Accordingly it is possible to foam in situ in shell 38 a polyurethane plastic to which has been added trichloromono-fluoromethane, for example, to form the outer insulating layer 37b.

While foamed plastic insulation of the type just described can be produced having a low thermal conductivity which is less than half of the thermal conductivity of rock wool, for example, such foamed plastic will not withstand the high tempertaures developed by the generator 10 during normal operation of the system. However, foamed plastic insulation can withstand for a prolonged period of time temperatures within a definite temperature range. Accordingly, the inner insulating layer 37a is so constructed and formed that the boundary between the inner and outer insulating layers coincides with the locus for temperature values which are within the aforementioned definite temperature range in the temperature gradient in the body of insulation 37.

In accord with the invention, the inner insulating layer 37a may be so constructed and formed that the temperature gradient in an outward direction therethrough will be sufficient to enable the outer portion of the outer insulating layer 37b to tend to function at its normal value of thermal conductivity and allow the inner portion of the outer insulating layer to lose some of its thermal insulating properties. In such event, the ultimate thermal conductivity of the inner portion of the outer insulating layer 37b, when it loses some of its thermal insulating properties during normal operation of the system, desirably should be at least as low as that of the inner insulating layer 37a. The insulation body 37 may be so constructed and formed that the thermal insulating properties of only a small part of the outer insulating layer 37b deteriorates, such deterioration being due primarily to expulsion of the dense gas from the cells of the foamed plastic insulation.

In another form of the invention both the inner and outer insulating layers 37a and 37b may be formed of foamed plastic. In such case, the inner insulating layer 37a will lose some of its thermal insulating properties due to being subjected to the temperatures developed by the heating tube 11 and vapor lift pipe 31 and other generator pipes during normal operation of the system. As pointed out above, the loss in thermal insulating properties of the inner insulating layer 37a of foamed plastic is due to expulsion of the heavy or dense gas from the closed cells in the foamed material. In other respects, the inner insulating layer of foamed plastic retains all of its thermal insulating properties and may be very effectively employed in place of rock wool, because even the thermal conductivity of such impaired foamed plastic is still comparable to the thermal conductivity of insulating materials like glass wool and rock wool, for example. The interior of the heating tube 11, which receives the heating element 12, may be shielded from the inner foamed plastic insulating layer by providing an insulating section, such as the insulating tube 39 which extends downwardly to the bottom of the shell 38.

Figure 3:
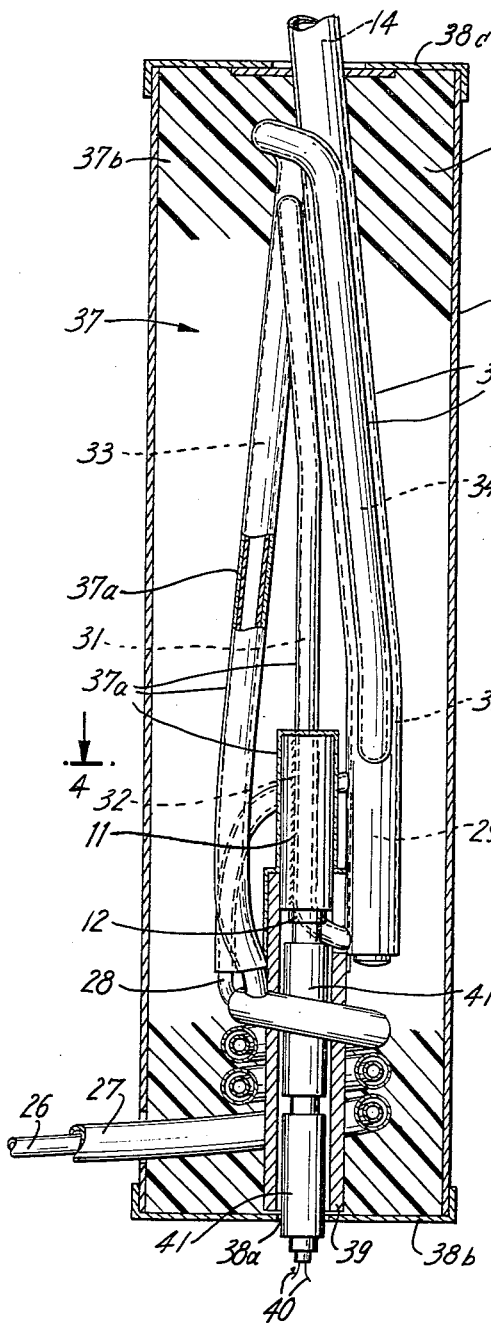
FIGS. 3 and 5 are views similar to FIG. 2 illustrating modifications of the invention.
Figure 4:
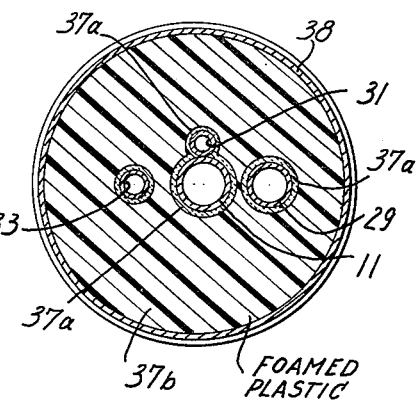
FIG. 4 is a sectional view taken at line 4—4 of FIG. 3.

When the insulation is provided for the generator or vapor expulsion unit 10, the inner layer 37a of insulation may be in the form of mats of suitable insulating material, such as glass wool, for example, as shown in FIGS. 3 and 4. The glass wool mats may be disposed about each pipe or conduit section of the generator 10 and the heating tube 11, such mats being secured in position by an adhesive tape. A core member may be positioned in the shell 38, such core member having an outer configuration similar to the insulating tube 39, after which a part of the glass wool mat covering the heating tube may overlap the top end of the core member.

The shell 38 is then positioned about the generator unit with the core member extending to the opening 38a in the bottom closure plate 38b of the shell. With the top cover plate 38c removed, a top opening is provided through which the foamable plastic material, such as polyurethane plastic, and a substance like trichloromono-fluoromethane, may be introduced. The resulting foamed plastic completely fills the space between the walls of the shell 38 and the refrigeration apparatus parts covered by the glass wool matting. When foaming of the plastic is taking place, all of the spaces within the shell 38 become completely filled with the insulating material and in the final stage of foaming a quantity of foamed plastic flows from the top opening. After the foamed plastic has set and hardened, it is trimmed at the top opening so that the top cover plate 38c may thereafter be fixed in place. Thereafter, the core member at the bottom opening 38b may be removed and the insulating tube 39 inserted into the hollow channel formed by the core member to permit the insertion and removal of the heating element 12 into and from the heating tube 11. This arrangement just described and shown in FIGS. 3 and 4 possesses the advantage that the liquid heat exchanger 27 is thermally insulated from the surroundings by foamed plastic, the outer part of which serves as the outer insulation layer and the inner part of which serves as the inner insulation layer. While the inner part of the foamed plastic disposed about the liquid heat exchanger may lose some of its thermal insulating properties due to expulsion of heavy gas contained in the cells of the insulation, such foamed plastic insulation still has a value of thermal conductivity which is considerably lower than that of conventional insulating materials like glass wool and rock wool, for example.

Figure 2:
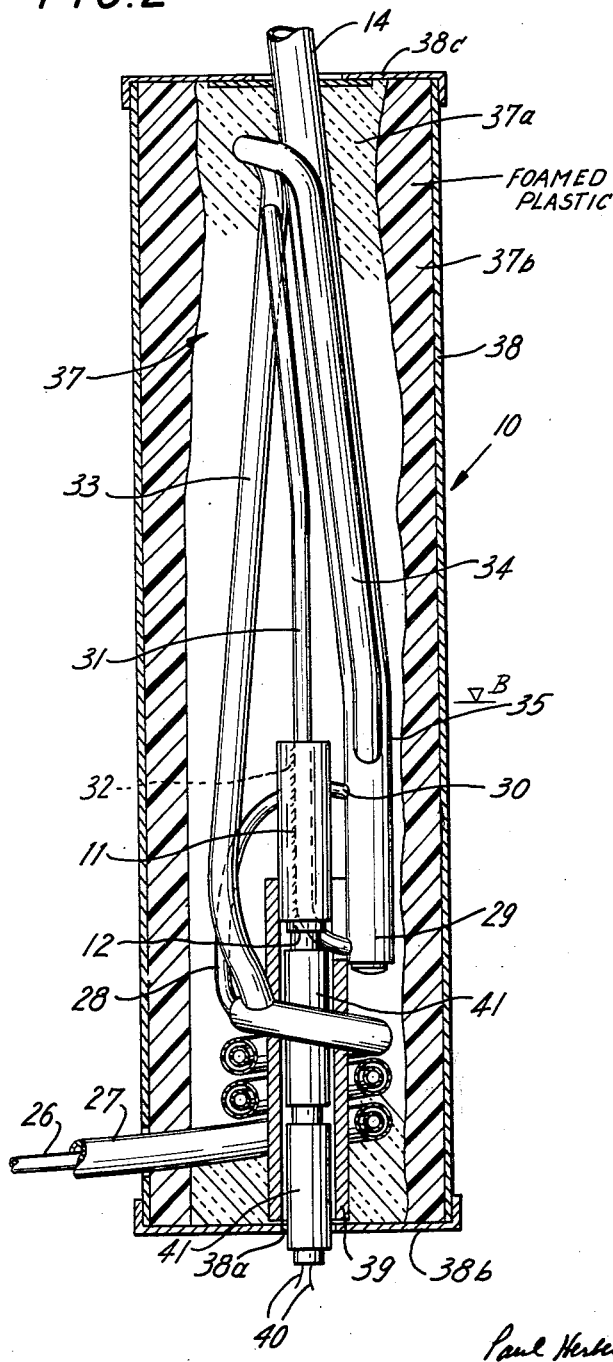
FIG. 2 is an enlarged fragmentary view, partly in section, of parts shown in FIG. 1 to illustrate details more clearly.

The embodiment of the invention shown in FIGS. 1 and 2 differs from the embodiment of FIGS. 3 and 4 in that the inner insulation layer 37a forms a core extending vertically upward through the entire height of the shell 38 from the bottom closure plate 38a to the top cover plate 38c. In FIGS. 1 and 2 the inner insulation layer 37a, which may be formed of glass wool or rock wool, is wrapped about the generator 10, heating tube 11, hollow insulating tube 39 and liquid heat exchanger 27. Thereafter, the foamed plastic outer insulating layer 37b may be foamed in situ as explained above in describing the FIGS. 3 and 4 embodiment.

Instead of foaming the outer plastic insulation layer 37b in situ in the embodiments described above, the foamed plastic insulation may be preformed in a number of parts or sections which may be assembled to provide a unitary foamed plastic insulation body similar to the foamed insulation bodies shown in FIGS. 1 and 2 and in FIGS. 3 and 4.

Figure 5:
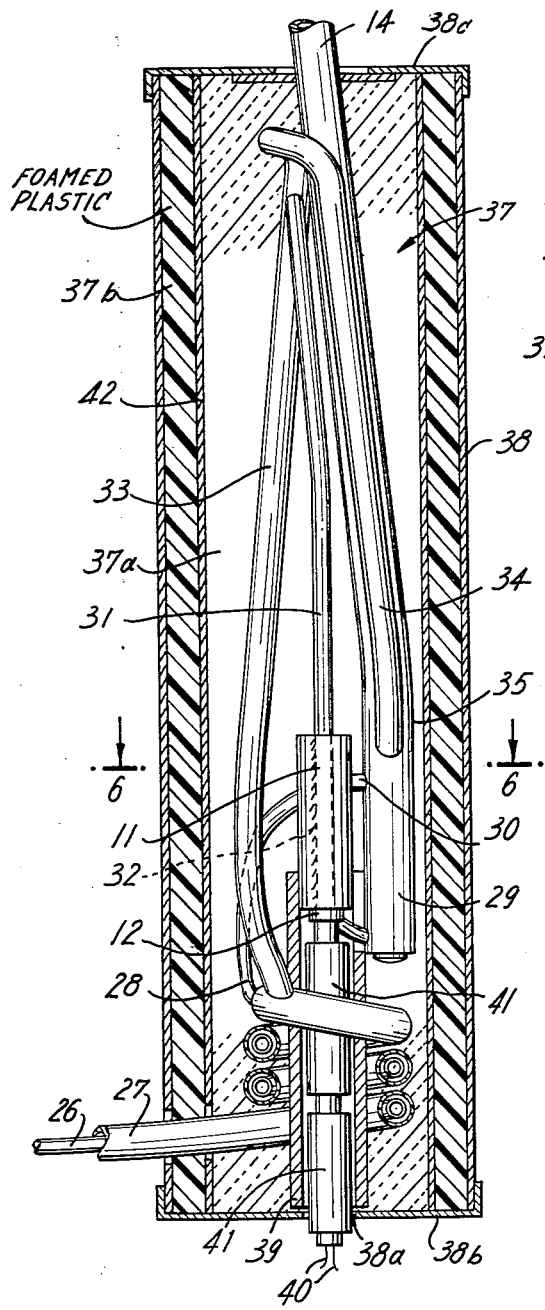
Figure 6:
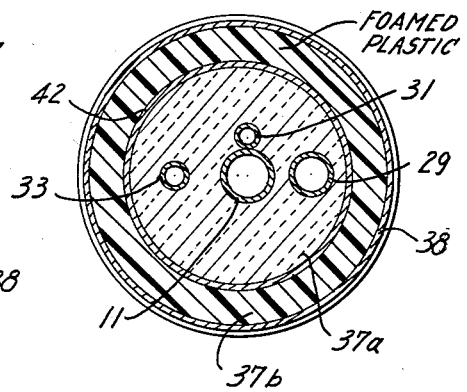
FIG. 6 is a sectional view taken at line 6—6 of FIG. 5.
Figure 7:
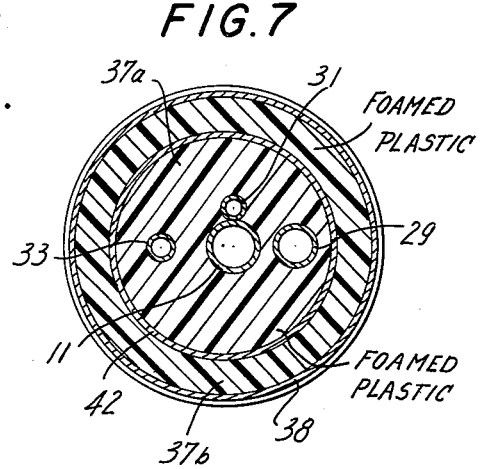
FIG. 7 is a sectional view similar to FIG. 6 illustrating another modification of the invention.

In the form of the invention shown in FIG. 5, the outer insulation layer 37b may be preformed in several sections or may be formed in situ in the shell 38 with the aid of a cylindrical core member. After such outer insulation layer 37b is provided for the shell 38 and the vapor expulsion unit 10 and liquid heat exchanger 27 positioned therein, the inner space may be filled with foamed plastic or a suitable finely divided insulating material, such as a silicon compound like that available under the trademark "Santocel," to provide the inner insulation layer 37a. Before the finely divided material is introduced into the space with the foamed plastic outer layer 37b, it is desirable to seal all visible cracks in the outer insulation layer and the joint between heating tube 11 and insulating tube 39 with a suitable high temperature cement, such as a silicon gum, for example. When foamed plastic is employed to provide both the inner and outer layers 37a and 37b of insulation, both layers may be formed in situ in a single foaming operation.

Also, a sheet 42 of heat reflecting material, such as aluminum foil, may be fixed to the inner surface of the outer insulation layer 37b before the finely divided insulating material is introduced into the shell 38 or foamed plastic is formed in situ to provide the inner insulating layer 37a. It will be understood that a sheet of heat reflecting material may be provided at the boundary between the insulating layers 37a and 37b in each of the embodiments of FIGS. 1 and 2 and FIGS. 3 and 4. When the heat reflecting material is provided within the outer insulating layer 37b in FIG. 5 and the inner foamed plastic layer 37a is subsequently foamed in situ within the outer insulating layer 37b, the sheet of reflecting material will become bonded to the outer surface of the foamed plastic layer 37a.

In view of the foregoing, it will now be understood that an improved insulation structure has been provided for the generator or vapor expulsion unit of absorption refrigeration systems. The insulation arrangement of the invention is especially useful in that it can be installed when the refrigeration system is completely fabricated and after the numerous metal parts thereof are welded together and tested for leaks on many occasions during the fabricating process. After the refrigeration system is completed, the insulation structure may be installed about the parts of the vapor expulsion unit in the manner shown in the drawing and described above.

Although we have shown and described particular embodiments of our invention, it will be obvious to those skilled in the art that various changes and modifications may be made without departing from the spirit and scope of the invention. We, therefore, aim in the following claims to cover all such modifications and changes as fall within the true spirit and scope of the invention.

We claim:

1. In an absorption refrigeration system having a circuit for circulation of absorption liquid comprising an absorber and a generator and liquid heat exchanger therebetween having passages for flowing in thermal relation absorption liquid rich and weak, respectively, in refrigerant, a plurality of pipes in the immediate vicinity of one another, one of said pipes forming a heating tube, said generator comprising several of said pipes which are connected in said circuit and at least one of which contains absorption liquid arranged to receive heat from said heating tube, means for heating said heating tube, means for insulating said generator and said heating tube from the surroundings comprising an inner layer of insulation and an outer layer of insulation of lower thermal conductivity than the inner layer, the outer layer of insulation comprising material which is adversely affected and loses at least some of its thermal insulating properties when subjected to heat at elevated temperatures corresponding to the temperatures developed by said heating tube and said one generator pipe due to heating by said heating means during normal operation of the system, said inner layer of insulation being capable of withstanding the heat produced by said heating tube during normal operation of the system and being so constructed and formed that the temperature gradient in an outward direction therethrough will be sufficient to enable the outer portion of said outer layer of insulation to tend to function at a value of thermal conductivity approaching its normal value and allow the inner portion of the outer layer of insulation to lose some of its thermal insulating properties due to heat developed by said heating member and said one generator pipe during normal operation of the system, the thermal conductivity of the inner portion of said outer layer of insulation being at least as low as the thermal conductivity of the inner layer of insulation when it loses some of its thermal insulating properties during normal operation of the system, said outer layer of insulation comprising foamed plastic, and heat reflecting material at the inner surface of the foamed plastic.

2. Apparatus as set forth in claim 1 in which the heat reflecting material comprises aluminum foil.

3. In an absorption refrigeration system having a circuit for circulation of absorption liquid comprising an absorber and a generator and liquid heat exchanger therebetween having passages for flowing in thermal relation absorption liquid rich and weak, respectively, in refrigerant, a plurality of pipes in the immediate vicinity of one another, one of said pipes forming a heating tube, said generator comprising several of said pipes which are connected in said circuit and at least one of which contains absorption liquid arranged to receive heat from said heating tube, means for heating said heating tube, means for insulating said generator and said heating tube from the surroundings comprising an inner layer of insulating material and an outer layer of insulating material of lower thermal conductivity than the inner layer, the boundary between said layers essentially coinciding with the locus for temperature values which are within a definite temperature range in the temperature gradient in said insulating means, and heat reflecting material disposed between said inner and outer layers of insulation.

4. Apparatus as set forth in claim 3 in which said reflecting material comprises aluminum foil.

5. In an absorption refrigeration system having a circuit for circulation of absorption liquid comprising an absorber and a generator and liquid heat exchanger therebetween having passages for flowing in thermal relation absorption liquid rich and weak, respectively, in refrigerant, a plurality of pipes in the immediate vicinity of one another, one of said pipes forming a heating tube, said generator comprising several of said pipes which are connected in said circuit and at least one of which contains absorption liquid arranged to receive heat from said heating tube, means for heating said heating tube, means for insulating said generator and said heating tube from the surroundings comprising an inner layer of insulation and an outer layer of insulation, the thermal conductivity of said outer layer of insulation being poorer than that of said inner layer of insulation, said outer layer of insulation being disposed about said inner layer of insulation and comprising foamed plastic which contains a dense gas and is adversely affected and loses at least some of its thermal insulating properties when subjected to heat at elevated temperatures corresponding to the temperatures developed by said heating tube and said one generator pipe due to heating by said heating means during normal operation of the system, and said inner layer of insulation being capable of withstanding the heat produced by said heating tube during normal operation of the system and thermally shielding said outer layer of insulation from said heating tube and said generator piping.

6. In an absorption refrigeration system having a circuit for circulation of absorption liquid comprising an absorber and a generator and liquid heat exchanger therebetween having passages for flowing in thermal relation absorption liquid rich and weak, respectively, in refrigerant, a plurality of pipes in the immediate vicinity of one another, one of said pipes forming a heating tube, said generator comprising several of said pipes which are connected in said circuit and at least one of which contains absorption liquid arranged to receive heat from said heating tube, means for heating said heating tube, means for insulating said generator and said heating tube from the surroundings comprising an inner layer of insulation and an outer layer of insulation, the thermal conductivity of said outer layer of insulation being poorer than that of said inner layer of insulation, said inner layer of insulation comprising finely divided insulating material and said outer layer of insulation being disposed about said inner layer of insulation and comprising foamed plastic which is adversley affected and loses at least some of its thermal insulating properties when subjected to heat at elevated temperatures corresponding to the temperatures developed by said heating tube and said one generator pipe due to heating by said heating means during normal operation of the system, and said inner layer of insulation being capable of withstanding the heat produced by said heating tube during normal operation of the system and thermally shielding said outer layer of insulation from said heating tube and said generator piping.

7. Apparatus as set forth in claim 6 in which the finely divided insulating material comprises a silicon compound.

8. In an absorption refrigeration system having a circuit for circulation of absorption liquid comprising an absorber and a generator and liquid heat exchanger therebetween having passages for flowing in thermal relation absorption liquid rich and weak, respectively, in refrigerant, a plurality of pipes in the immediate vicinity of one another, one of said pipes forming a heating tube, said generator comprising several of said pipes which are connected in said circuit and at least one of which contains absorption liquid arranged to receive heat from said heating tube, means for heating said heating tube, and means for insulating said generator and said heating tube from the surroundings comprising an inner layer of insulating material and an outer layer of insulating material, the thermal conductivity of said outer layer of insulating material being poorer than that of said inner layer of insulating material, said outer layer of insulating material being disposed about said inner layer of insulating material and comprising foamed plastic which contains a dense gas, the boundary between said layers essentially coinciding with the locus for temperature values which are within a definite temperature range in the temperature gradient in said insulating means.

9. In an absorption refrigeration system having a circuit for circulation of absorption liquid comprising an absorber and a generator and liquid heat exchanger therebetween having passages for flowing in thermal relation absorption liquid rich and weak, respectively, in refrigerant, a plurality of pipes in the immediate vicinity of one another, one of said pipes forming a heating tube, said generator comprising several of said pipes which are connected in said circuit and at least one of which contains absorption liquid arranged to receive heat from said heating tube, means for heating said heating tube, and means for insulating said generator and said heating tube from the surroundings comprising an inner layer of insulating material and an outer layer of insulating material, the thermal conductivity of said outer layer of insulating material being poorer than that of said inner layer of insulating material, said outer layer of insulating material being disposed about said inner layer of insulating material and comprising foamed polyurethane, the boundary between said layers essentially coinciding with the locus for temperature values which are within a definite temperature range in the temperature gradient in said insulating means.

10. Apparatus as set forth in claim 9 in which said foamed polyurethane contains gaseous trichloromonofluormethane.

11. In an absorption refrigeration system having a circuit for circulation of absorption liquid comprising an absorber and a generator and liquid heat exchanger therebetween having passages for flowing in thermal relation absorption liquid rich and weak, respectively, in refrigerant, a plurality of pipes in the immediate vincinity of one another, one of said pipes forming a heating tube, said generator comprising several of said pipes which are connected in said circuit and at least one of which contains absorption liquid arranged to receive heat from said heating tube, means for heating said heating tube, and means for insulating said generator and said heating tube from the surroundings comprising an inner layer of insulating material and an outer layer of insulating material, the thermal conductivity of said outer layer of insulating material being poorer than that of said inner layer of insulating material, said outer layer of insulating material being disposed about said inner layer of insulating material which comprises glass wool, the boundary between said layers essentially coinciding with the locus for temperature values which are within a definite temperature range in the temperature gradient in said insulating means.

12. Apparatus as set forth in claim 11 in which the inner layer of insulation comprises at least one finely divided silicon compound.

References Cited in the file of this patent

UNITED STATES PATENTS

| | | |
|---|---|---|
| 2,538,011 | Kogel | Jan. 16, 1951 |
| 2,653,139 | Sterling | Sept. 22, 1953 |
| 2,739,456 | Saunders | Mar. 27, 1956 |
| 2,748,575 | Backstrom | June 5, 1956 |
| 2,768,091 | Chubberley | Oct. 23, 1956 |
| 2,817,123 | Jacobs | Dec. 24, 1957 |

OTHER REFERENCES

Modern Plastics Encyclopedia, volume 38, Number 1A, pages 344–347, published 1960.